United States Patent Office 3,342,802
Patented Sept. 19, 1967

3,342,802
WATER-INSOLUBLE MONOAZO-DYESTUFF
Joachim Ribka, Offenbach am Main, Germany, assignor to Farbwerke Hoechst Aktiengesellschaft vormals Meister Lucius & Brüning, Frankfurt am Main, Germany, a corporation of Germany
No Drawing. Filed Nov. 27, 1963, Ser. No. 326,371
Claims priority, application Germany, Dec. 5, 1962, F 38,469
1 Claim. (Cl. 260—203)

The present invention relates to a new water-insoluble monoazo-dyestuff and to a process for preparing it; more particularly the invention relates to a dyestuff of the following formula

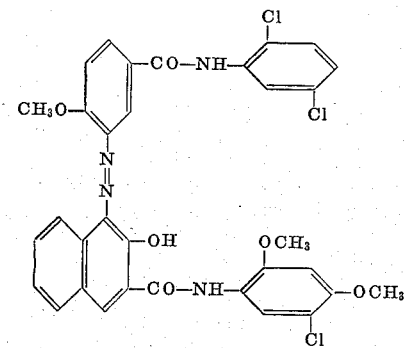

and to processes for preparing it by coupling or condensation according to known methods.

The dyestuff can be prepared by coupling in substance, on the fiber or on another substratum. For preparing this dyestuff in substance diazotized 1-amino-2-methoxy-benzene-5-carboxylic acid (2',5'-dichloro)-phenylamide is coupled with 1 - (2',3' - hydroxynaphthoylamino) - 2,4-dimethoxy - 5 - chlorobenzene in an aqueous medium preferably in the presence of a non-ionogenic anion or cation active dispersing agent or in an organic solvent such as, for example, pyridine or quinoline. When coupling in an aqueous medium it is advantageous for obtaining an optimum granular condition of the pigment to heat the coupling mixture for some time, for example, to boil in the presence of small quantities of an organic solvent such as, for example, pyridine, a hydrocarbon, such as dichlorobenzene, a phthalic acid dialkyl ester or a resin soap.

As coupling component in the process of the present invention there can also be used the Mannich bases of 1 - (2',3' - hydroxynaphthoylamino) - 2,4 - dimethoxy-5-chlorobenzene having the general formula

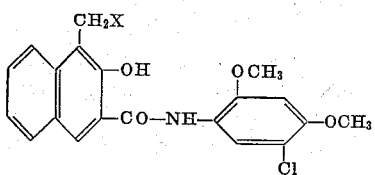

wherein X represents the radical of a primary or secondary aliphatic amine, of a primary aliphatic aminoalcohol or of a hydrogenated heterocyclic nitrogen base.

In order to obtain particularly pure and fast dyeings it is advantageous to purify said dyestuff prepared by coupling in substance by stirring it for some time, if desired in the heat, for example with pyridine, dimethyl formamide or another suitable organic solvent. It is advantageous in some cases to grind the crude pigment by means of a suitable auxiliary grinding agent, in order to convert it into a finely dispersed form.

The preparation of the dyestuff by coupling on fibers of natural or synthetic origin, such as for example, cotton, regenerated cellulose, polyvinyl alcohol fiber, acetate silk or polyamide fibers, is carried out according to the dyeing and printing processes known from the ice-colour technique. The coupling may also be carried out on another substratum for example on barium sulfate.

The prepartion of the dyestuff by condensation can be carried out in different manners. The carboxylic acid halide, for example, obtained by coupling diazotized 1-amino-2-methoxybenzene-5-carboxylic acid with 1-(2',3'-hydroxynaphthoylamino) - 2,4 - dimethoxy - 5 - chlorobenzene and by a subsequent treatment with agents which convert the carboxylic acid group into the carboxylic acid halide group, such as phosphorus trichloride, phosphorus pentachloride, phosphorus oxychloride, phosphorus pentabromide or thionyl chloride, is condensed with 1-amino-2,5-dichlorobenzene, or the carboxylic acid halide obtained by coupling diazotized 1 - amino - 2 - methoxy-benzene - 5 - carboxylic acid (2',5 - dichloro) - phenylamide with 2,3 - hydroxynaphthoic acid and subsequent treatment with agents which convert the carboxylic acid group into the carboxylic acid halide group, is condensed with 1 - amino - 2,4 - dimethoxy - 5 - chlorobenzene, suitably in an indifferent solvent, such as, dichlorobenzene, toluene, xylene, or nitrobenzene.

The new monoazo-dyestuff prepared by coupling or condensation in substance represents a water-insoluble pigment distinguished by a good fastness to light and to solvents, and by a pure carmine red tint of the dyeings. The dyestuff is suited for dyeing or printing textile materials of vegetable or animal fibers, such as wool, cotton or linen, of semisynthetic fibers, such as regenerated cellulose, for example, artificial silk or viscose, or of synthetic fibers, produced, for example, from polycondensation, polymerization or polyaddition products, according to the known pigment dyeing or pigment printing processes. The dyestuff may also be added to spinning solutions, if desired, before polycondensation or polymerization. Furthermore, it is appropriated for dyeing or printing paper, paperboard and for dyeing paper pulps, furthermore for dyeing lacquers and films of different composition, for example, of cellulose acetate, cellulose propionate or cellulose butyrate, nitrocellulose, polyvinyl acetate, polyvinyl chloride, copolymers of vinyl chloride and vinylidene chloride, polyethylene, polypropylene, polyamides, polyacrylonitrile or its copolymers, or polyesters or alkyd resins.

The novel dyestuff is also appropriated for dyeing natural or synthetic resins, for example epoxy resins, polyester resins, vinyl resins, polystyrene resins, alkyd resins or aldehyde resins, such as formaldehyde condensation products of phenol, urea or melamine and for dyeing emulsions of synthetic resins, such as, for example, oil-in-water or water-in-oil emulsions, furthermore for dyeing natural rubber-like materials, such as caoutchouc or guttapercha or of synthetic vulcanizable materials, such as polychloroprene, olefinic polysulfides, polybutadiene or of copolymers from butadiene and styrene or from butadiene and acrylonitrile.

Compared with the azo dyestuffs known from German Patent 889,739 which are obtained by coupling diazotized 1 - amino - 2 - methoxy - benzene - 5 - carboxylic acid phenylamide with 1 - (1',3' - hydroxynaphthoylamino)-2,4 - dimethoxy - 5 - chlorobenzene or of diazotized 1-amino - 2 - methoxybenzene - 5 - carboxylic acid - (2'-methyl - 5' - chloro) phenylamine with 1 - (2',3'-hydroxynaphthoylamino) - 2,4 - dimethoxy - 5 - chlorobenzene the novel dyestuff is distinguished by a better fastness to light.

The following examples serve to illustrate the present invention but they are not intended to limit it thereto.

EXAMPLE 1

31.1 parts by weight of 1-amino-2-methoxy-benzene-5-carboxylic acid (2′,5′-dichloro)-phenylamide were introduced into a mixture of 100 parts by volume of 5 N-hydrochloric acid and 300 parts by volume of water and stirred for some hours. The mixture was then diluted with water to 1500 parts by volume and diazotized at room temperature with 20 parts by volume of 5 N-sodium nitrite solution. After having been clarified by treating with kieselgur the diazonium solution thus obtained was introduced into a solution of 36 parts by weight 1-(2′,3′-hydroxynaphthoylamino) - 2,4 - dimethoxy - 5 - chlorobenzene in 1000 parts by volume of pyridine. When the coupling was completed the mixture was further stirred for 1 hour at 50–60° C., then the dyestuff was filtered off with suction, washed and dried.

The dystuff thus isolated represents a red powder. The graphic printings made by means of this dyestuff possess a pure carmine red tint and a good fastness to light and to solvents. Furthermore the lacquerings prepared by means of this dyestuff have a good fastness to overspraying.

EXAMPLE 2

According to Example 1 a diazonium solution of 31.1 parts by weight of 1-amino-2-methoxy-benzene-5-carboxylic acid (2′,5′-dichloro)-phenylamide was prepared. This solution was dropped at 55° C. into a dispersion of 36 parts by weight of 1-(2′,3′-hydroxynaphthoylamino)-2,4-dimethoxy-5-chlorobenzene prepared by dissolving this compound in a dilute sodium hydroxide solution and by acidifying with acetic acid in the presence of the reaction product of about 20 mols ethylene oxide and 1 mol octadecyl alcohol. The coupling was completed in the course of 60–90 minutes. Subsequently 20 parts by volume of pyridine and 15 parts by volume of o-dichlorobenzene were added to the coupling mixture which was boiled for about 1 hour, the dyestuff was filtered off with suction, washed with water and dried at 65° C.

EXAMPLE 3

Cotton yarn was treated for 45 minutes at 35° C. at a goods-to-liquor ratio of 1:20 in an impregnation bath, prepared as described below, then it was centrifuged off and developed at 20° C. for 30 minutes in the developing bath prepared as described below. The yarn was then rinsed with 3 cc. of hydrochloric acid of 20° Bé. per liter of water, soaped for 15 minutes first at 60° C., then for 15 minutes at 95° C., in a bath containing 1 gram of a reaction product of about 10 mol ethylene oxide and 1 mol isododecyl phenol and 3 grams of calcinated soda per liter of water. The dyeings thus obtained were rinsed and dried.

*Impregnation bath*

4.3 grams of 1-(2′,3′-hydroxynaphthoylamino)-2,4-dimethoxy-5-chlorobenzene were dissolved in a mixture containing 13.5 cc. of denaturated ethyl alcohol, 1.5 cc. sodium hydroxide solution of 38° Bé., 4.5 cc. water of 40° C. and 1.5 cc. formaldehyde solution of 33 percent strength. The solution thus obtained was then adjusted to 1 liter with water of 35° C., 3 grams of a condensation product consisting of fatty acids of high molecular weight and of protein decomposition products and with 10 cc. of sodium hydroxide solution of 38° Bé.

*Developing bath*

3.1 grams of 1-amino-2-methoxybenzene-5-carboxylic acid (2′,5′-dichloro)-phenylamide were diazotized with 4 cc. hydrochloric acid of 20° Bé. and 4 cc. of an aqueous sodium nitrite solution in a ratio of 1:5. The diazo solution thus obtained was introduced into a bath, which contains per liter of water 2 grams of a reaction product obtained by reacting about 20 mols of ethylene oxide with 1 mol octadecyl alcohol and further 1.5 grams monosodium phosphate, 5.5 grams disodium phosphate and 20 grams sodium chloride.

There were obtained dyeings with a bluish red tint possessing a good fastness to light.

EXAMPLE 4

51 parts by weight of the azo dyestuff prepared by coupling 1 mol of diazotized 1-amino-2-methoxybenzene-5-carboxylic acid (2′,5′-dichloro)-phenylamide with 1 mol 2,3-hydroxynaphthoic acid were heated under reflux in 1200 parts by volume of chlorobenzene and the small quantity of water which was present was distilled off in the form of an azeotrope. The mixture was cooled to 70° C., and 10 parts by volume dimethyl formamide and 10 parts by volume thionyl chloride were added. The mixture was then gradually heated until boiling and refluxed until no more hydrochloric acid was formed. The carboxylic acid chloride of the dyestuff which had formed was filtered off with suction and washed with chlorobenzene and petroleum ether. 28 parts by weight of the carboxylic acid chloride were heated with 1000 parts by volume of chlorobenzene, 10 parts by volume of pyridine and 10 parts by volume of 1-amino-2,4-dimethoxy-5-chlorobenzene for 6 hours under reflux. Subsequently the dyestuff formed was filtered off with suction, washed with chlorobenzene and petroleum ether and dried. It represents a claret powder.

EXAMPLE 5

26 parts by weight of the azo dyestuff obtained by coupling 1 mol of diazotized 1-amino-2-methoxybenzene-5-carboxylic acid with 1 mol of 1-(2′,3′-hydroxynaphthoylamino)-2,4-dimethoxy-5-chlorobenzene were introduced into 500 parts by volume of dry chlorobenzene. The mixture was heated to 70° C. and was mixed at this temperature with 2 parts by volume of dimethylformamide and 6.5 parts by volume of thionyl chloride. The mixture was heated for 30 minutes to 75° C., boiled for 2 hours under reflux and the carboxylic acid chloride of the dyestuff formed was separated off. 26.5 parts by weight of the carboxylic acid chloride were heated with 800 parts by volume of chlorobenzene, 10 parts by volume of pyridine and 9 parts by weight of 1-amino-2,5-dichlorobenzene for 6 hours under reflux. Subsequently the deystuff formed was sucked off, washed with chlorobenzene and petroleum ether and dried. There was obtained a claret powder.

I claim:

The water-insoluble monoazo-dyestuff of the formula

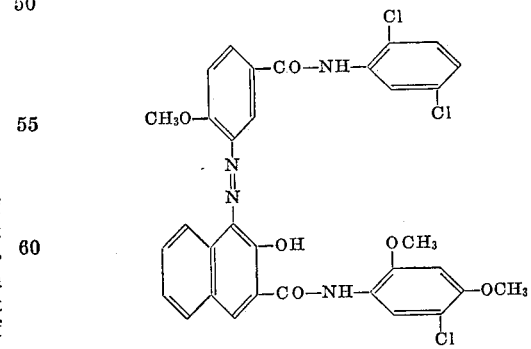

References Cited

UNITED STATES PATENTS 2,703,319   3/1955   Fischer _____ 260—203
2,915,518   12/1959  Fischer _____ 260—203

CHARLES B. PARKER, *Primary Examiner.*

D. PAPUGA, *Assistant Examiner.*